United States Patent
Park et al.

(10) Patent No.: US 8,898,414 B2
(45) Date of Patent: Nov. 25, 2014

(54) STORAGE DEVICES AND METHODS OF DRIVING STORAGE DEVICES

(75) Inventors: Hyun-Chul Park, Ansan-si (KR);
Kyung-Ho Kim, Seoul (KR); Sang-Mok Kim, Seoul (KR); O-Tae Bae, Daegu (KR); Dong-Gi Lee, Yongin-si (KR);
Jeong-Hoon Jeong, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 120 days.

(21) Appl. No.: 13/547,018

(22) Filed: Jul. 11, 2012

(65) Prior Publication Data
US 2013/0080685 A1 Mar. 28, 2013

(30) Foreign Application Priority Data
Sep. 28, 2011 (KR) .................. 10-2011-0098462

(51) Int. Cl.
*G06F 12/00* (2006.01)
*G06F 12/02* (2006.01)
*G06F 3/06* (2006.01)

(52) U.S. Cl.
CPC .......... *G06F 3/0608* (2013.01); *G06F 12/0253* (2013.01); *G06F 3/0679* (2013.01); *G06F 3/0641* (2013.01)
USPC .................. 711/165; 707/692; 711/103

(58) Field of Classification Search
USPC .................. 711/103, 165; 707/692
See application file for complete search history.

(56) References Cited

U.S. PATENT DOCUMENTS

| | | | |
|---|---|---|---|
| 7,818,495 B2 | 10/2010 | Tanaka et al. | |
| 8,171,216 B2 * | 5/2012 | Dawkins | 711/114 |
| 2006/0282644 A1 * | 12/2006 | Wong | 711/206 |
| 2009/0172333 A1 * | 7/2009 | Marcu et al. | 711/165 |

FOREIGN PATENT DOCUMENTS

| | | |
|---|---|---|
| JP | 2006-099419 | 4/2006 |
| JP | 2007-249509 | 9/2007 |
| KR | 1020090131224 | 12/2009 |

* cited by examiner

*Primary Examiner* — Kalpit Parikh
(74) *Attorney, Agent, or Firm* — Myers Bigel Sibley & Sajovec, P.A.

(57) ABSTRACT

A storage device includes a data storage having first and second storage areas corresponding to different physical addresses. First data are stored in the first storage area. The storage device further includes a first memory that stores a reference count associated with the first data, and a controller that rearranges the first data from the first storage area to the second storage area in response to a change in the reference count of the first data.

15 Claims, 9 Drawing Sheets

STORAGE DEVICES AND METHODS OF DRIVING STORAGE DEVICES

CROSS-REFERENCE TO RELATED APPLICATION

This application claims priority from Korean Patent Application No. 10-2011-0098462 filed on Sep. 28, 2011 in the Korean Intellectual Property Office, and all the benefits accruing therefrom under 35 U.S.C. 119, the disclosure of which is incorporated herein by reference in its entirety.

BACKGROUND

1. Field of the Inventive Concept

The present inventive concept relates to storage devices and methods of driving storage devices.

2. Description of the Related Art

Flash memories have the capability of electrically erasing all of the data of a cell at once. Flash memories are therefore widely used in computers, memory cards, and other electronic devices. Recently, as the use of mobile information devices, such as cellular phones, personal digital assistants (PDAs) and digital cameras, is increasing, flash memory is increasingly being used for data storage instead of hard disk drives. Mobile devices are increasingly requiring larger data storage capacity to provide a variety of functions (for example, motion picture play, high sound quality music play, etc.).

De-duplication is a technique of eliminating redundant data while sharing one piece of data when a plurality of pieces of same data exists in a storage device. Conventional de-duplication techniques have been developed based on hard disk drive operational techniques. Development of de-duplication technique has focused on, for example, expediting de-duplication, using a minimum amount of additional data, and so on.

SUMMARY

The present inventive concept provides a storage device capable of performing a de-duplication operation.

The present inventive concept also provides a driving method of a storage device capable of performing a de-duplication operation.

These and other objects of the present inventive concept will be described in or be apparent from the following description of the preferred embodiments.

A storage device according to an aspect of the present inventive concept includes a data storage having first and second storage areas corresponding to different physical addresses, with first data stored in the first storage area. The storage device includes a first memory that stores a reference count associated with the first data, and a controller that rearranges the first data from the first storage area to the second storage area in response to a change in the reference count of the first data.

According to another aspect of the present inventive concept, there is provided a storage device including a data storage having first and second memory blocks corresponding to different physical addresses. The first and second memory blocks also correspond to one or more logical addresses. First data is stored in the first memory block. The storage device further includes a first memory that stores a reference count associated with the first data, a second memory that stores mapping information of the logical address corresponding to the first memory block and the physical addresses corresponding to the first memory block, and a controller that rearranges the first data from the first memory block to the second memory block as part of a garbage collection operation in response to a change in the reference count of the first data.

BRIEF DESCRIPTION OF THE DRAWINGS

The above and other features and advantages of the present inventive concept will become more apparent by describing in detail preferred embodiments thereof with reference to the attached drawings in which.

DESCRIPTION OF EMBODIMENTS

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. In the drawings, the thickness of layers and regions are exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
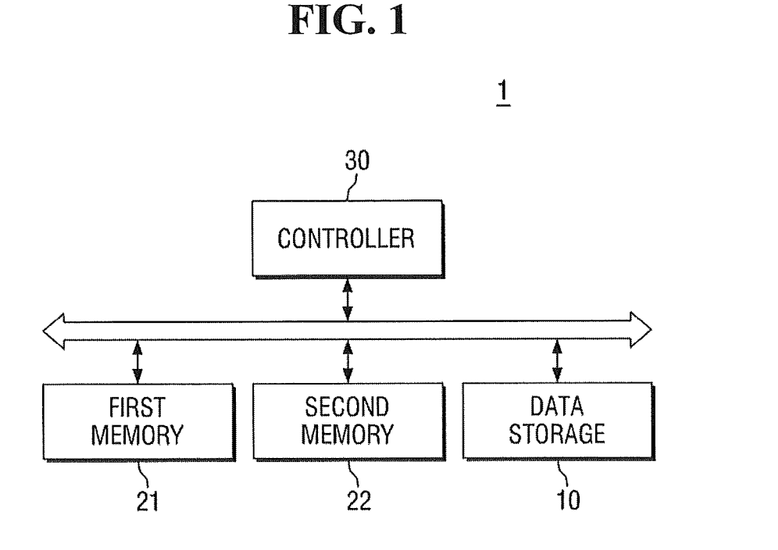
FIG. 1 is a block diagram of a storage device according to a first embodiment of the present inventive concept.
Figure 2:
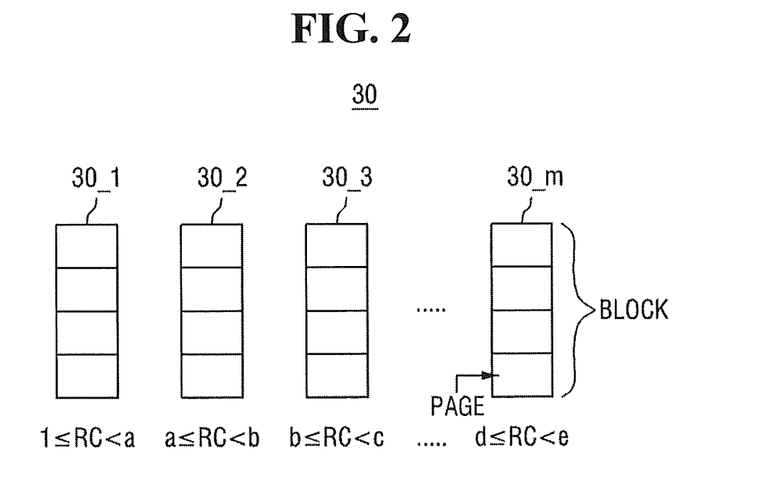
FIGS. 2 and 3 are block diagrams of a data storage shown in FIG. 1.
Figure 3:
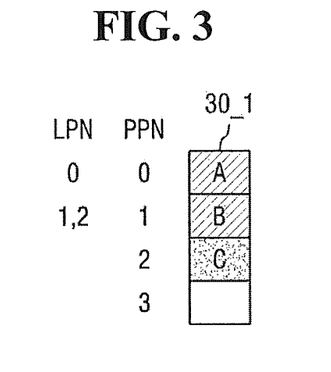

FIG. 1 is a block diagram of a storage device according to a first embodiment of the present inventive concept, and FIGS. 2 and 3 are block diagrams of a data storage shown in FIG. 1.

Referring to FIGS. 1 to 3, the storage device 1 according to the first embodiment of the present inventive concept may include a data storage 10, a first memory 21, a second memory 22, and a controller 30.

The data storage 10 includes a plurality of storage areas 30_1 to 30_m. The data storage 10 may be a flash memory (for example, an NAND flash memory), but is not limited thereto. For example, the data storage 10 may have another configuration, such as a NOR flash memory, and/or may be another nonvolatile memory, such as PRAM, FRAM, or MRAM.

As shown, each of the storage areas 30_1 to 30_m may include a plurality of sub areas. The storage areas 30_1 to 30_m may be used as units for an erase operation, and the sub areas may be used as units for a write operation. For example, the storage areas 30_1 to 30_m may be memory blocks and the sub blocks may be pages, but other configurations are possible. In FIG. 2, each memory block includes four (4) pages, but the memory blocks are not limited thereto. In addition, the memory block is a unit for erase operation (that is, one memory block is erased at once), and the page is a unit for write operation.

The plurality of storage areas 30_1 to 30_m may correspond to a physical address PPN and a logical address LPN, respectively. The storage areas 30_1 to 30_m have two separate addresses PPN and LPN for the following reasons.

In order to write data in flash memories used as storage areas 30_1 to 30_m, the storage areas 30_1 to 30_m are first erased. As described above, a write operation may be performed pagewise, and an erase operation may be performed in units of memory blocks. Thus, an erase operation unit may be larger than a write operation unit.

In general, a hard disk is capable of overwriting stored data and a storage device using a flash memory is typically incapable of overwriting stored data. Therefore, in order to replace a hard disk in the storage device using a flash memory (that is, in order to use an existing file system for a hard disk without alteration), the erase operation that is performed before a write operation should be hidden from the file system.

To compensate for these problems, a flash translation layer (FTL) may be used between a file system and a flash memory. In the FTL, a logical address (LPN) generated by the file system is mapped to a physical address (PPN) of the flash memory in which an erase operation is performed, during a write operation of a flash memory. An address mapping table may be used in the FTL to facilitate address mapping. The address mapping table between the logical address LPN and the physical address PPN may be stored in the second memory 22.

Therefore, the respective storage areas 30_1 to 30_m may correspond to different physical addresses PPN. Each of the storage areas 30_1 to 30_m may correspond to at least one logical address LPN.

In addition, one page may correspond to at least one logical address LPN. As illustrated in FIG. 3 by way of example, a plurality of pages in the storage area 30_1 may correspond to physical addresses (PPN=0~3). The first page in the storage area 30_1 may correspond to a physical address (PPN=0) and a logical address (LPN=0). In addition, the second age in the storage area 30_1 may correspond to a physical address (PPN=1) and to multiple logical addresses (LPN=1, 2).

A storage device 1 according to a first embodiment of the present inventive concept may perform de-duplication of data stored therein. That is, when a plurality of copies of the same data exist in the data storage 10, only one piece of data may be retained and the remaining redundant data may be eliminated. For example, referring still to FIG. 3, the second page of the storage area 30_1 may correspond to a physical address (PPN=1) and multiple logical addresses (LPN=1, 2). That is to say, data B stored in the physical address (PPN=1) is shared. The degree by which the data B stored in physical address 1 shared is referred to as the reference count. Because the data stored in physical address 1 corresponds to two different logical addresses, the data B stored in the second page of the storage area 30_1 has a reference count of 2. That is, the reference count (RC) refers to the number of logical addresses corresponding to each page of the storage area 30_1. The reference count (RC) of the data B may be stored in the first memory 21 (FIG. 1).

In the storage device 1 according to the first embodiment of the present inventive concept, the storage areas 30_1 to 30_m storing data may vary according to the reference count of the data. In particular, data having a particular reference count belonging to a range is stored in each of the plurality of storage areas 30_1 to 30_m. As shown in FIG. 2, data having a reference count belonging to a first range ($1 \leq RC < a$) may be stored in the storage area 30_1, while data having a reference count belonging to a second range ($a \leq RC < b$) is stored in the storage area 30_2, data having a reference count belonging to a third range ($b \leq RC < c$) is stored in the storage area 30_3, and data having a reference count belonging to an mth range ($d \leq RC < e$) is stored in the storage area 30_m, where $a < b < c < d < e$, and a, b, c, d and e are natural numbers. The first to mth ranges may be different from each other.

If the reference count of data is varied, the controller 30 may rearrange the data. For example, in a state in which data A having a reference count of 1 is stored in the storage area 30_1, if the reference count of data A is increased to 3, the data A may be rearranged to reside in the storage area 30_2. Conversely, in a state in which data C having a reference count of 3 is stored in the storage area 30_2, if the reference count of data C is decreased to 1, the data C may be rearranged to reside in the storage area 30_1. The data rearrangement will later be described in detail with reference to FIGS. 2 to 10.

In FIG. 3, the data A and B are valid data stored in pages having physical addresses PPN=0, 1 of the storage area 30_1, and the data C is invalid data stored in the page at PPN=2. The invalid data will be briefly described as follows. For example, if data C is stored in the storage area 30_1 and a reference count of the data C is varied, the data C may be copied to another storage area (e.g., storage area 30_2). However, as noted above, data cannot be erased at the page level, but can only be erased in units of memory blocks. Therefore, the data C stored in the storage area 30_1 is not erased when it is copied to the other storage area. The data that remains in storage area 30_1 is therefore invalid data.

As described above, if storage areas of data, that is, the storage areas 30_1 to 30_m, are changed according to the data reference count, the following effects are provided.

According to embodiments of the inventive concept, the data reference count of data stored in a storage area (e.g., 30_1) is the same or similar. Therefore, the timing points at which the data stored in the storage area 30_1 are turned into invalid data may be the same as or similar to each other.

In particular, when the storage area 30_1 is to be erased, valid data in the storage area 30_1 should be transferred to another storage area (e.g., 30_2). If all of the data stored in the storage area 30_1 is invalid data, the storage area 30_1 can be immediately erased without transferring any data. In a storage device 1 according to the first embodiment of the present inventive concept, the data in the storage area 30_1 are all invalid data at timing points at which the data stored in the storage area 30_1 are the same or similar to each other, thereby reducing or minimizing data transfer during the erase operation.

Figure 4:
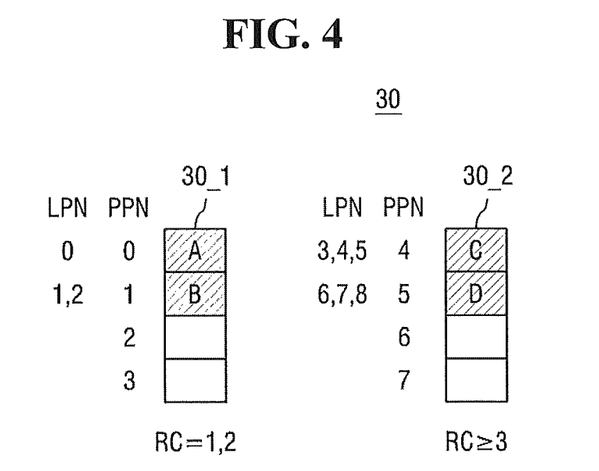
FIG. 4 is a block diagram of a storage device according to a second embodiment of the present inventive concept.

FIG. 4 is a block diagram of a storage device according to a second embodiment of the present inventive concept. For convenience sake of explanation, the following description will focus on differences between the storages according to the first and second embodiments.

Referring to FIG. 4, while the data storage 30 of the storage device according to the first embodiment of the present inventive concept includes three or more storage areas 30_1 to 30_min according to the data reference count, a data storage 30 of the storage device according to the second embodiment of the present inventive concept may include two storage areas 30_1 and 30_2, and pages may be stored in either storage area 30_1 or storage area 30_2 according to the data reference counts of the pages.

Data having reference counts belonging to a first range (RC=1, 2) is stored in the storage area 30_1 of the data storage 30, and data having reference counts belonging to a second range (RC≥3) is stored in the storage area 30_2. As shown, a first page of the storage area 30_1 may correspond to one logical address (LPN=0) and a second page may correspond to two logical addresses (LPN=1, 2). In addition, the first page of the storage area 30_2 may correspond to three logical addresses (LPN=3, 4, 5) and a second page may correspond to three logical addresses (LPN=6, 7, 8).

In a storage device according to the second embodiment of the present inventive concept in which two storage areas 30_1 and 30_2 are defined, the number of times the data is rearranged (that is, transfer amount) may be smaller than that in the storage device according to the first embodiment of the present inventive concept.

Meanwhile, in the storage device according to the second embodiment of the present inventive concept, the first range may mean that reference counts are 1 and 2 (that is, RC=1, 2) and the second range may mean that reference counts are 3 and greater (that is, RC≥3). However, the inventive concept is not limited thereto. For example, the first range may have reference counts of 1, 2 and 3 and the second range may have reference counts of 4 and greater. In addition, the first range may have a reference count of 1 and the second range may have reference counts of 2 and greater (that is, a case where there are shared data), so that non-shared data may be stored in the storage area 30_1 and shared data may be stored in the storage area 30_2.

In a case where the first range has reference counts of 1 and 2 and the second range has reference counts of 3 and greater, data transfer may be less frequent than in a case where the first range has a reference count of 1 and the second range has reference counts of 2 and greater. In a case where the first range has a reference count of 1 and the second range has reference counts of 2 and greater (that is, in a case where non-shared data is stored in the storage area 30_1 and shared data is stored in the storage area 30_2), it may be desirable to rearrange data from the storage area 30_1 to the storage area 30_2 as soon as the non-shared data is turned into the shared data. In addition, as soon as the shared data is turned into non-shared data, data should be rearranged from the storage area 30_2 to the storage area 30_1. Therefore, in a case where the first range has a reference count of 1 and the second range has reference counts of 2 and greater, data may be rearranged relatively frequently. However, the case where the first range has a reference count 1 and the second range has reference counts of 2 and greater may be more appropriate according to the kind of storage device used than the previous case where the first range has a reference count of 1 and 2 and the second range has reference counts of 3 and greater.

Hereinafter, operations of storage devices according to some embodiments of the present inventive concept with changes in timing points of rearranging data with varied reference counts will be described with reference to FIGS. 5 to 7.

Figure 5:
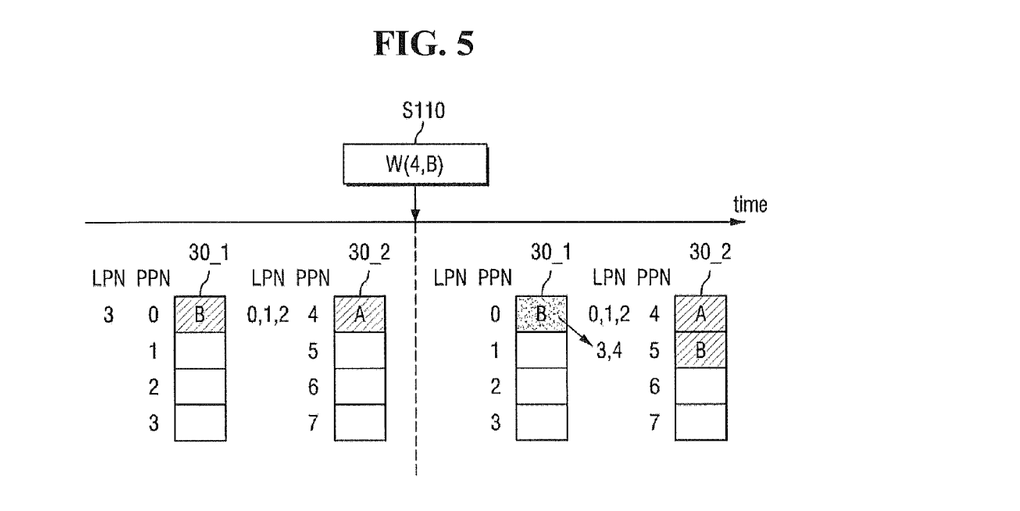
FIG. 5 is a block diagram of a storage device according to a third embodiment of the present inventive concept
Figure 6:
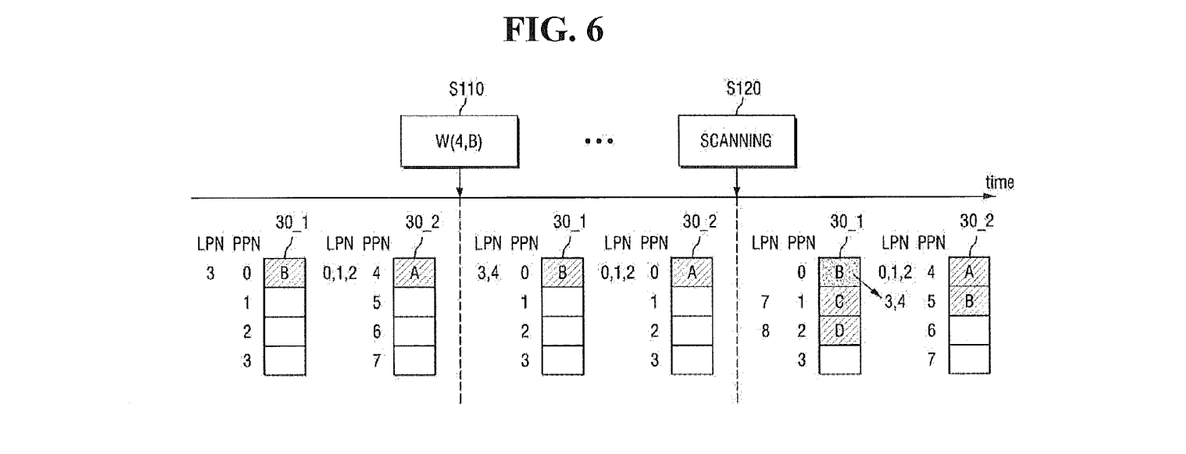
FIG. 6 is a block diagram of a storage device according to a fourth embodiment of the present inventive concept.
Figure 7:
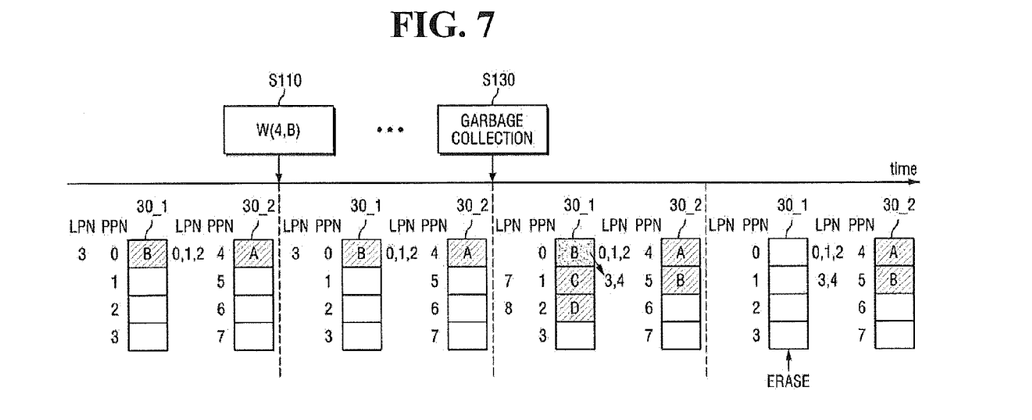
FIG. 7 is a block diagram of a storage device according to a fifth embodiment of the present inventive concept.

For convenience sake of explanation, FIGS. 5 to 7 show an embodiment in which two storage areas 30_1 and 30_2 are provided, and in which data having a reference count of 1 (RC=1) is stored in the storage area 30_1 and data having reference counts of 2 and greater (RC≥2) is stored in the storage area 30_2.

FIG. 5 is a block diagram of a storage device according to a third embodiment of the present inventive concept.

Referring to FIG. 5, in the storage device according to the third embodiment of the present inventive concept, a controller (30 of FIG. 1) rearranges data to reside in a storage area corresponding to the data reference count in response to a change in the data reference count.

In detail, data B is stored in the first page of the storage area 30_1. The first page of the storage area 30_1 corresponds to a physical address (PPN=0) and a logical address (LPN=3). Data A is stored in the first page of the storage area 30_2. The first page of the storage area 30_2 corresponds to a physical address (PPN=4) and logical addresses (LPN=0, 1, 2).

Next, a command instructing the device to store the data B at the logical address (LPN=4) is input. Therefore, the reference count of data B increases from 1 to 2. In response to the reference count of the data B being varied, the data B is copied from the storage area 30_1 to the storage area 30_2. In particular, the data B is copied from the first page of the storage area 30_1 to the second page of the storage area 30_2. The second page of the storage area 30_2 corresponds to a physical address (PPN=5) and logical addresses (LPN=3, 4).

Meanwhile, the data B stored in the first page of the storage area 30_1 has not yet been erased, and is now invalid data. The data B stored in PPN=0 of storage area 30_1 is invalid data until the storage area 30_1 is erased.

In the storage device according to the third embodiment of the present inventive concept, as soon as the data reference count is varied, the data is rearranged to reside in a storage area corresponding to the data reference count. In this case, since data rearrangement is performed rapidly in response to a change in the reference count, it may be easy to manage the rearrangement of data, thereby potentially reducing the time required for scanning data with a varied reference count at a later time.

FIG. 6 is a block diagram illustrating operations of a storage device according to a fourth embodiment of the present inventive concept.

Referring to FIG. 6, in the storage device according to a fourth embodiment of the present inventive concept, data is not immediately rearranged as soon as the data reference count is varied. Rather, the controller 30 (FIG. 1) may rearrange data having a varied reference count as a background job during an idle time.

In detail, data B is stored in the first page of the storage area 30_1 and data A is stored in the first page of the storage area 30_2.

Next, a command instructing the device to store the data B at the logical address (LPN=4) is input. The first page of the storage area 30_1 now corresponds to logical addresses (LPN=3, 4). Therefore, the reference count of data B is increased from 1 to 2. However, the data B may not be immediately rearranged even though the reference count of data B has been varied.

The controller 30 may scan the storage device to identify data having a varied reference count. This scan may be performed, for example, as a background job during an idle time of the controller 30.

During scanning, the data B having the changed reference count is detected from the storage area 30_1. The data B is copied from the first page of the storage area 30_1 to the second page of the storage area 30_2.

In the storage device according to the fourth embodiment of the present inventive concept, the data having the changed reference count may be copied during the idle time. In this case, a response time can be reduced and data transfer may also be reduced.

FIG. 7 is a block diagram illustrating operations of a storage device according to a fifth embodiment of the present inventive concept.

Referring to FIG. 7, in the storage device according to the fifth embodiment of the present inventive concept, when a storage area 30_1 in which data having a varied reference count is stored is to be subjected to garbage collection, the controller (30 of FIG. 1) rearranges the data having the varied reference count(s).

Garbage collection is a method for dynamically managing the memory. In a garbage collection process, the storage space of data can be reclaimed by an operating system when it is determined that the data is not further required in a memory space. A garbage collection operation may result in memory space becoming available for reuse by other programs.

Referring to FIG. 7, the data B is stored in the first page of the storage area 30_1 and data A is stored in the first page of the storage area 30_2.

Next, a command instructing the controller 30 (FIG. 1) to store the data B at the logical address (LPN=4) is input. The first page of the storage area 30_1 corresponds to logical addresses (LPN=3, 4). Therefore, the reference count of the data B is increased from 1 to 2. Here, the data B having the varied reference count is not immediately rearranged.

Next, garbage collection is initiated.

If the storage area 30_1 is to be erased, valid data in the storage area 30_1 is first copied to a new appropriate storage area. Since the data B has a reference count of 2, the data B is rearranged from the first page of the storage area 30_1 to the second page of the storage area 30_2. Next, the storage area 30_1 is then erased.

In the storage device according to the fifth embodiment of the present inventive concept, data having varied reference counts are rearranged during garbage collection. In this case, the number of times of data transfer can be minimized.

Hereinafter, operations of a storage device according to a sixth embodiment of the present inventive concept are described with reference to FIGS. 8 and 9. In a storage device according to the sixth embodiment, the timing point of rearrangement of data having a decreased reference count is changed.

Figure 8:
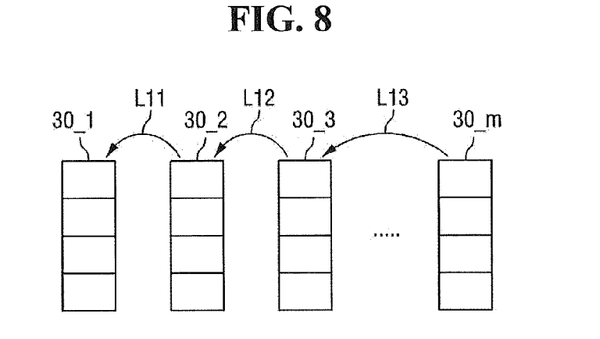
FIG. 8 is a block diagram of a storage device according to a sixth embodiment of the present inventive concept.
Figure 9:
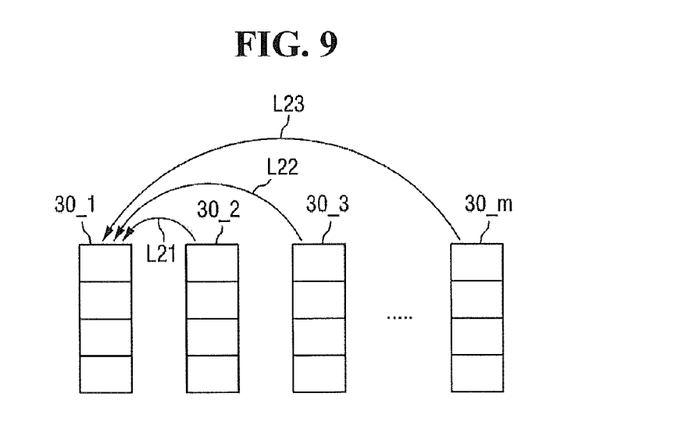
FIG. 9 is a block diagram of a storage device according to a seventh embodiment of the present inventive concept.

For convenience sake of explanation, FIGS. 8 and 9 show m storage areas 30_1 to 30_m. Data having a reference count belonging to a first range ($1 \leq RC < a$) is stored in the storage area 30_1, data having a reference count belonging to a second range ($a \leq RC < b$) is stored in the storage area 30_2, data having a reference count belonging to a third range ($b \leq RC < c$) is stored in the storage area 30_3, and data having a reference count belonging to an mth range ($d \leq RC < e$) is stored in the storage area 30_m, where $a < b < c < d < e$, and a, b, c, d, and e are natural numbers. FIG. 8 is a block diagram of a storage device according to a sixth embodiment of the present inventive concept.

Referring to FIG. 8, when the data having the varied reference counts need to be rearranged at some stage, they are rearranged to reside in the storage areas 30_1 to 30_m corresponding to the varied reference counts. Here, the rearrangement timing points may include a time at which the reference count is varied, as shown in FIG. 5, a time for performing a background job during an idle time, as shown in FIG. 6, and a time for performing garbage collection, as shown in FIG. 7.

For example, if the reference count of the data stored in the storage area 30_m is decreased, the data may be rearranged to reside in the storage area 30_3 corresponding to the varied reference count, as indicated by L13. In addition, if the reference count of the data stored in the storage area 30_3 is decreased, the data may be rearranged to reside in the storage area 30_2 corresponding to the varied reference count, as indicated by L12. If the reference count of the data stored in the storage area 30_2 is decreased, the data may be rearranged to reside in the storage area 30_1 corresponding to the varied reference count, as indicated by L11.

FIG. 9 is a block diagram illustrating operations of a storage device according to a seventh embodiment of the present inventive concept.

Referring to FIG. 9, in the storage device according to the seventh embodiment of the present inventive concept, even if the reference count of data is decreased, the data is not immediately rearranged. If the reference count of data is continuously decreased to be in the first range ($1 \leq RC < a$), which is smallest, the data is rearranged to reside in the storage area 30_1. In this way, the data stored in the storage areas 30_2 to 30_m are rearranged to reside in the storage area 30_1, as indicated by L21, L22, and L23, respectively.

In addition, it is assumed that the smallest reference count range RC is 1 (that is, no data is shared.). In this case, even if the reference counts thereof are decreased, shared data having reference counts of 2 and greater are not rearranged to reside in the storage area 30_1 until no data is shared.

Figure 10:
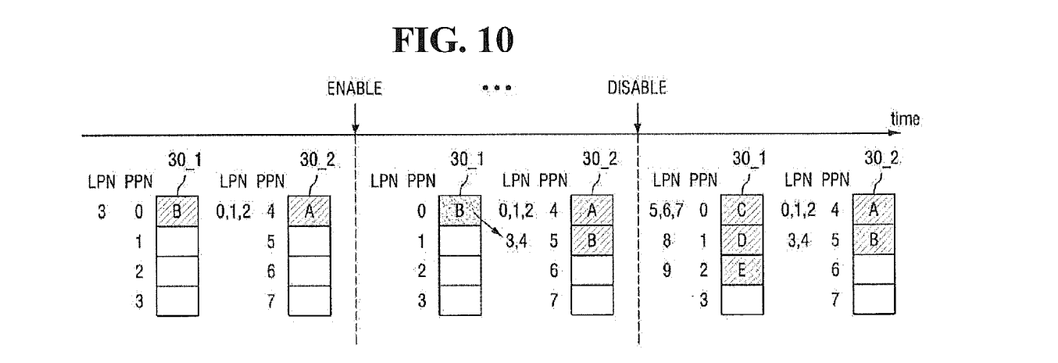
FIG. 10 is a block diagram of a storage device according to an eighth embodiment of the present inventive concept.

FIG. 10 is a block diagram illustrating operations of a storage device according to an eighth embodiment of the present inventive concept.

Referring to FIG. 10, in the storage device according to the eighth embodiment of the present inventive concept, a controller (30 of FIG. 1) may enable or disable a de-duplication operation.

That is to say, the controller 30 rearranges data having varied reference counts in a de-duplication enable mode. Here, the rearrangement of data means the operations described above with reference to FIGS. 2 to 9. On the other hand, the controller 30 may not rearrange data in a de-duplication disable mode even if the reference counts of data are varied.

As shown in FIG. 10, data B is stored in the first page of the storage area 30_1 and data A is stored in the first page of the storage area 30_2. In the de-duplication enable mode, when a command of instructing to store the data B to the logical address (LPN=4) is input, the data B is rearranged from the storage area 30_1 to the storage area 30_2. Thereafter, in the de-duplication disable mode, even when data C stored in the storage area 30_1 has a reference count of 3, it is not rearranged to reside in the storage area 30_2.

Hereinafter, a storage system employing a storage device according to some embodiments of the present inventive concept will be described.

Figure 11:
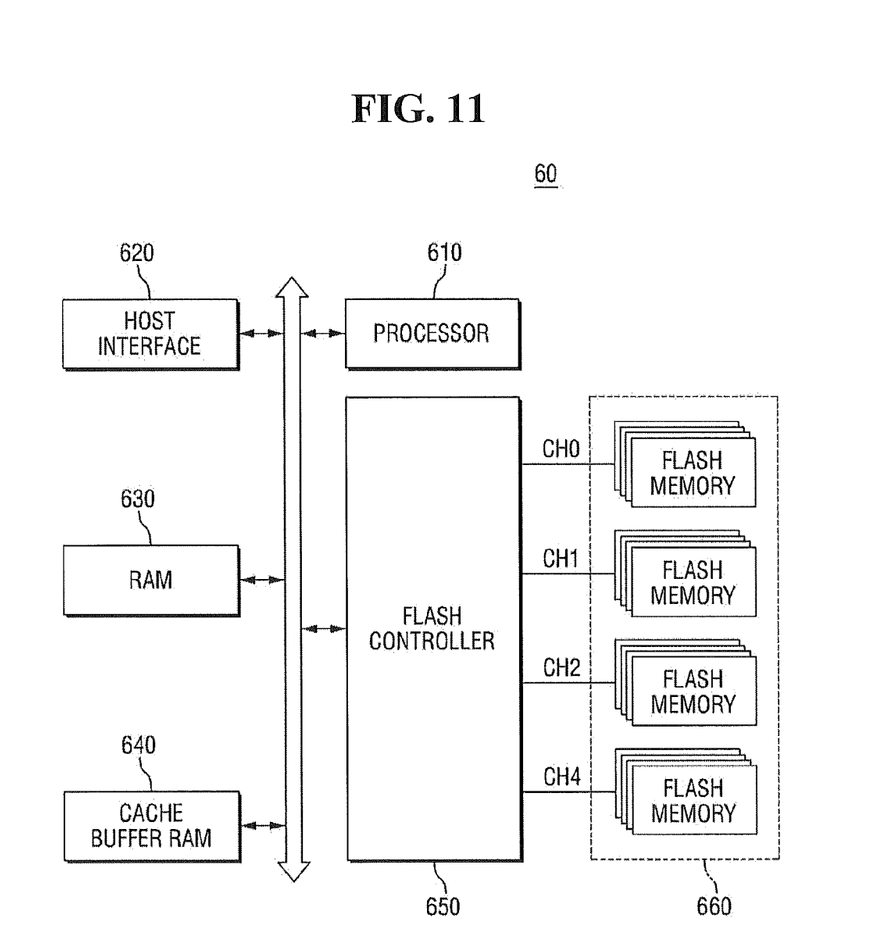
FIG. 11 is a block diagram of an exemplary solid state disk (SSD) employing a storage device according to some embodiments of the present inventive concept.

FIG. 11 is an example block diagram of a solid state disk (SSD) employing a storage device according to some embodiments of the present inventive concept.

Referring to FIG. 11, the SSD 60 may include a processor 610, a host interface 620, an RAM 630, a cache buffer RAM 640, a flash controller 650, and a plurality of flash memories 660 (660). Here, the flash controller 650 may correspond to the controller 30 shown in FIG. 1, the plurality of flash memories 66 may correspond to the data storage 10 shown in FIG. 1, and the RAM 630 may correspond to the first memory 21 and the second memory 22 shown in FIG. 1.

The host interface 620 exchange data with a host under the control of the processor 610. The host interface 620 fetches commands and addresses from host and transfers the same to the processor 610 through a CPU bus. Here, the host interface 620 may be an SATA interface, a PATA interface, and an ESATA (External SATA) interface. The data input from the host or the data to be transferred to the host through the host interface 620 may be transferred through a cache buffer RAM 640 under the control of the processor 610 without passing the CPU bus.

The RAM 630 may be used to temporarily store data required to drive the SSD 60. The RAM 630 is a volatile memory device, including, for example, DRAM or SRAM.

The cache buffer RAM 640 temporarily stores the data exchanged between the host and the flash memories 660. In addition, the cache buffer RAM 640 is used to store a program to be executed by the processor 610. The cache buffer RAM 640 is a kind of a buffer memory, which may be implemented by SRAM.

The flash controller 650 may exchange data with the flash memories 660 used as a storage device. As described above with reference to FIGS. 1 to 10, the flash controller 650 controls storage areas in the plurality of flash memories 660 storing data to be changed according to the data reference count. The flash controller 650 may be configured to support an NAND flash memory, a one-NAND flash memory, a multi-level flash memory, or a sing-level flash memory.

Meanwhile, the processor 610 and the flash controller 650 may be implemented by a single ARM processor.

Figure 12:
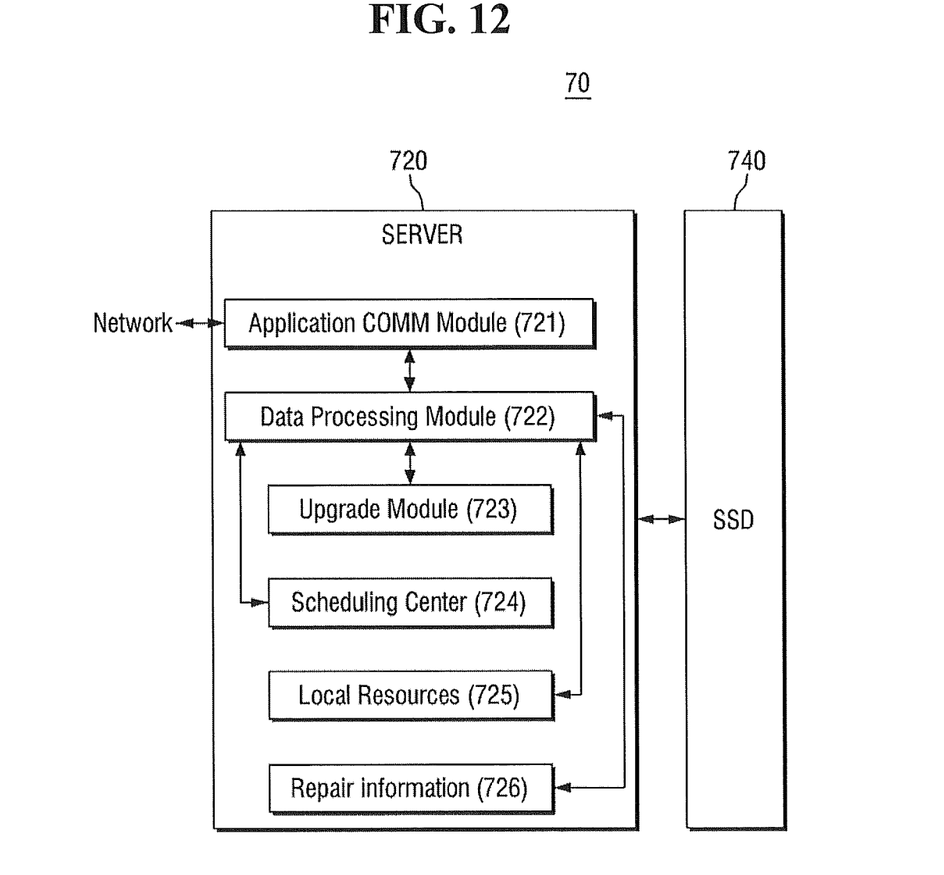
FIG. 12 is a block diagram of a server system using the SSD shown in FIG. 11.

FIG. 12 is a block diagram of a server system using the SSD shown in FIG. 11.

Referring to FIG. 12, the server system 70 may include a server 720 and a solid state disk 740 storing data required to drive the server 720. Here, the SSD 740 may have the same configuration as the SSD 60 shown in FIG. 11.

The server 720 may include an application communication module 721, a data processing module 722, an upgrade module 723, a scheduling center 724, a local resource module 725, and a repair information module 726.

The application communication module 721 may be configured to communicate with the server 720 or a computing system connected to a network or to allow the server 720 and the SSD 740 to communicate with each other. The application communication module 721 transmits data or information supplied through a user interface to the data processing module 722.

The data processing module 722 may be linked to the local resource module 725. Here, the local resource module 725 offers a list of repair shops/dealers/technical information to the user based on the data or information input to the server 720.

The upgrade module 723 interfaces with the data processing module 722. The upgrade module 723 may upgrade firmware reset codes and test system based on the data or information transmitted from the SSD 740 or may upgrade other types of information to electronic appliance.

The scheduling center 724 gives permission on real-time option based on the data or information input to the server 720.

The repair information module 726 interfaces with the data processing module 722. The repair information module 726 may be used to offer repair-related information (for example, audio, video or text file) to users. The data processing module 722 packages the pertinent information based on the information transmitted from the SSD 740. Thereafter, the information may be transmitted to the SSD 740 or displayed to users.

Figure 13:
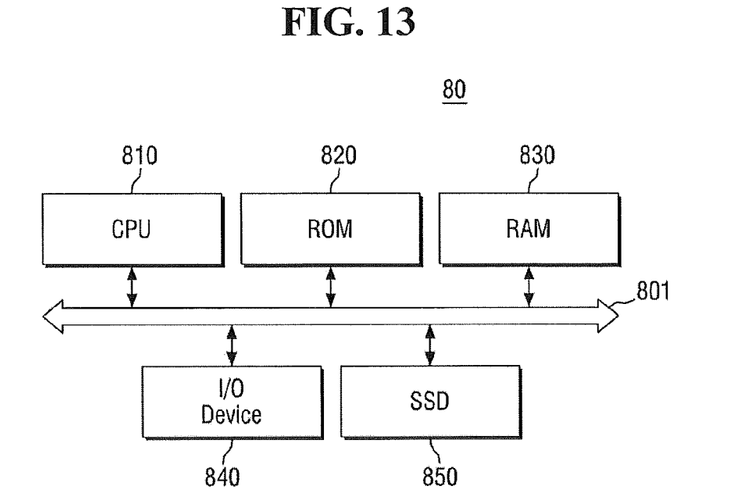
FIG. 13 is a block diagram of a computing system using the SSD shown in FIG. 1.

FIG. 13 is a block diagram of a computing system using the SSD shown in FIG. 1.

Referring to FIG. 13, the computing system 80 may include a central processing unit (CPU) 810, an ROM 820, an RAM 830, an input/output (I/O) device 840 and an SSD 850.

The CPU 810 may be connected to a system bus 801. The ROM 820 may store data required to drive the computing system 80. The data may include an initiation command sequence or a basic input/output operation system (e.g., BIOS) sequence. The RAM 830 may temporarily store data generated when the CPU 810 is executed.

The I/O device 840, including, for example, a keyboard, a pointing device (mouse), a monitor, a modem or the like, may be connected to the system bus 801 through I/O device interface.

The SSD 850, which is a readable storage device, may have the same configuration as the SSD 60 shown in FIG. 11.

Figure 14:
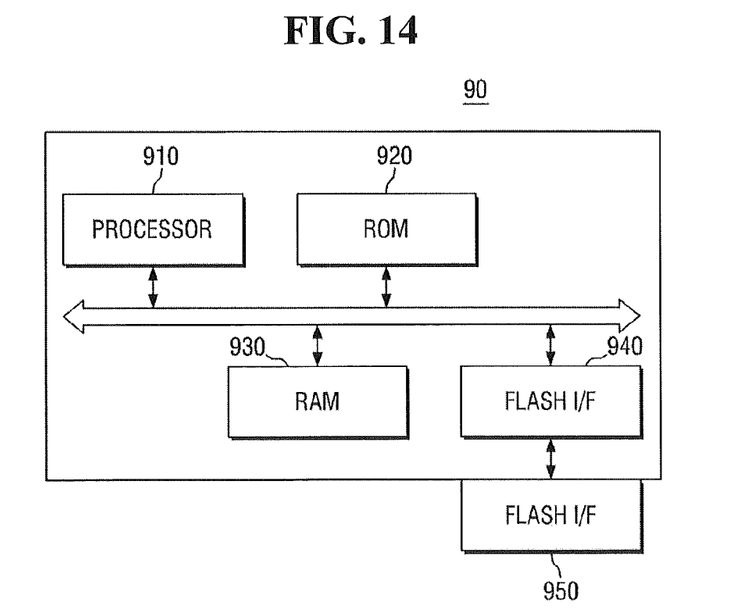
FIG. 14 is a block diagram of an electronic device using the SSD shown in FIG. 11.

FIG. 14 is a block diagram of an electronic appliance using the SSD shown in FIG. 11.

Referring to FIG. 14, the electronic appliance 90 may include a processor 910, an ROM 920, an RAM 930, a flash interface 940 and an SSD 950.

The processor 910 may access the RAM 930 to execute firmware codes or an arbitrary code. In addition, the processor 910 may access the ROM 920 to execute fixed command sequences including an initiation command sequence or a basic input/output operation system sequence. The flash interface 940 performs interfacing between the electronic appliance 90 and the SSD 950.

The SSD 950 is detachably installed in the electronic appliance 90. The SSD 950 may have the same configuration as the SSD 60 shown in FIG. 11.

The electronic appliance 90 according to the present inventive concept may include a cellular phone, a personal digital assistant (PDA), a digital camera, a camcorder, a portable audio player (e.g., MP3), a portable multimedia player (PMP), and so on.

Figure 15:
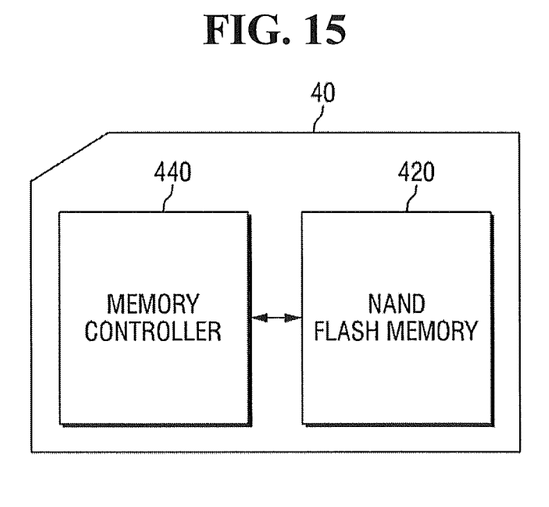
FIG. 15 is a block diagram of an exemplary memory card employing a storage device according to some embodiments of the present inventive concept.

Referring to FIG. 15, the memory card 40 may include an NAND flash memory 420 and a memory controller 440 controlling the NAND flash memory 420.

The NAND flash memory 420 may correspond to the data storage 10 shown in FIG. 1 and the memory controller 440 may correspond to the controller 30 shown in FIG. 1. For convenience sake of explanation, components corresponding to the first memory 21 and the second memory 22 shown in FIG. 1 are not shown in FIG. 15.

The memory card 40 may be applied to a multimedia card (MMC), a security digital (SD), miniSD, a memory stick, SmartMedia, a TransFlash card, and so on.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the inventive concept.

What is claimed is:

1. A storage device comprising;
    a data storage having first and second storage areas corresponding to different physical addresses, wherein first data is stored in the first storage area;
    a first memory that stores a reference count associated with the first data; and
    a controller that rearranges the first data from the first storage area to the second storage area in response to a change in the reference count of the first data;
    wherein the controller is configured to rearrange the first data having the varied reference count in a de-duplication enable mode, and not to rearrange the first data in a de-duplication disable mode even if the reference count of the first data is changed.

2. The storage device of claim 1, wherein data having a reference count belonging to a first range is stored in the first storage area, and data having a reference count belonging to a second range, that is different from the first range, is stored in the second storage area.

3. The storage device of claim 2, wherein data having reference counts of 1 and 2 are stored in the first storage area and data having reference counts of 3 or greater are stored in the second storage area.

4. The storage device of claim 2, wherein the data storage further includes third to mth storage areas wherein m is an integer greater than two, each of the third to mth storage areas having different physical addresses;
    wherein data having reference counts belonging to first to mth ranges are stored in the first to mth storage areas, respectively; and
    wherein the first to mth ranges increase sequentially and are different from each other.

5. The storage device of claim 4, wherein second data belonging to the mth range is stored in the mth storage area, and wherein the controller is configured, in response to the second data having a reference count that belongs to the first range, to rearrange the second data from the mth storage area to the first storage area.

6. The storage device of claim 4, wherein second data belonging to the mth range is stored in the mth storage area, and wherein the controller is further configured, in response to a change in the reference count of the second data, to rearrange the second data to a storage area corresponding to the changed reference count of the second data.

7. The storage device of claim 1, wherein the first storage area corresponds to at least one logical address, the storage device further comprising a second memory that stores an address mapping table between the logical address corresponding to the first storage area and the physical addresses corresponding to the first storage area.

8. The storage device of claim 1, wherein the controller is configured to rearrange the first data having the changed reference count as part of a garbage collection operation.

9. The storage device of claim 1, wherein the controller is configured to rearrange the first data having the varied reference count as a background job during an idle time.

10. The storage device of claim 1, wherein the controller is configured to rearrange the first data immediately in response to the change in the reference count of the first data.

11. The storage device of claim 1, wherein the first and second storage areas are memory blocks and the data storage is an NAND flash memory.

12. The storage device of claim 1, wherein the storage device is a solid state drive.

13. The storage device of claim 1, wherein each of the first and second storage areas includes a plurality of sub areas, and each of the plurality of sub areas is a unit for a write operation, and the first and second storage areas are units for an erase operation.

14. A storage device comprising:
    a data storage having first and second memory blocks corresponding to different physical addresses, the first and second memory blocks corresponding to one or more logical addresses, wherein first data is stored in the first memory block;
    a first memory that stores a reference count associated with the first data;
    a second memory that stores mapping information of the logical address corresponding to the first memory block and the physical addresses corresponding to the first memory block; and
    a controller that rearranges the first data from the first memory block to the second memory block during a garbage collection operation in response to a change in the reference count of the first data;
    wherein the controller is configured to rearrange the first data having the varied reference count in a de-duplication enable mode, and not to rearrange the first data in a de-duplication disable mode even if the reference count of the first data is changed.

15. A storage device comprising:
    a data storage including first and second storage areas, each storage area comprising a plurality of memory blocks having respective physical addresses, wherein the first storage area is configured to store data blocks corresponding to a first number of logical addresses and the second storage area is configured to store data blocks corresponding to a second number of logical addresses, wherein the second number is different from the first number; and a controller that is configured to rearrange a first data block from the first storage area to the second storage area in response to a change in number of logical addresses corresponding to the first data block;

wherein the controller is configured to rearrange the first data having the varied reference count in a de-duplication enable mode, and not to rearrange the first data in a de-duplication disable mode even if the reference count of the first data is changed.

* * * * *